Aug. 30, 1960  C. E. TACK  2,950,781
RAILWAY BRAKE
Filed March 6, 1957  3 Sheets-Sheet 2
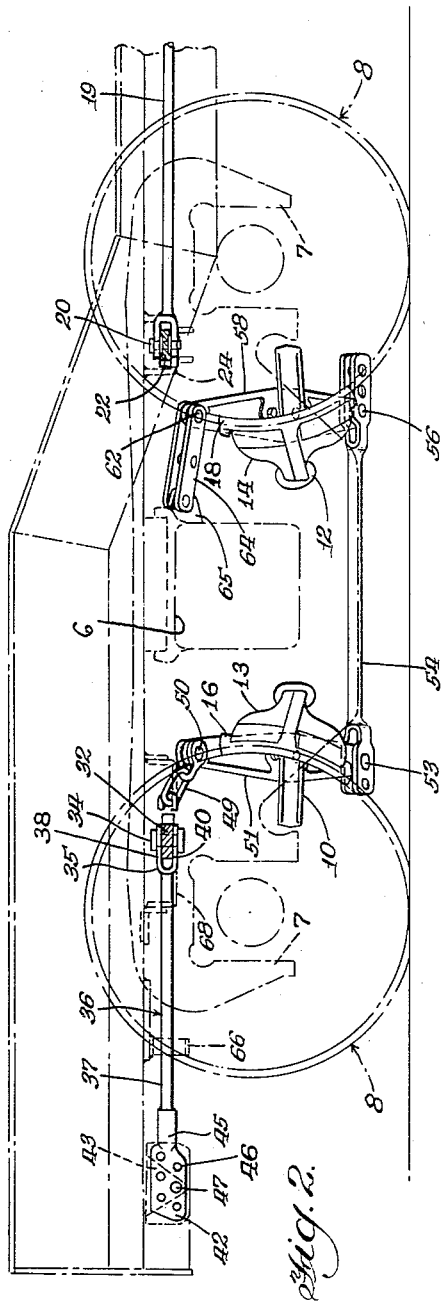
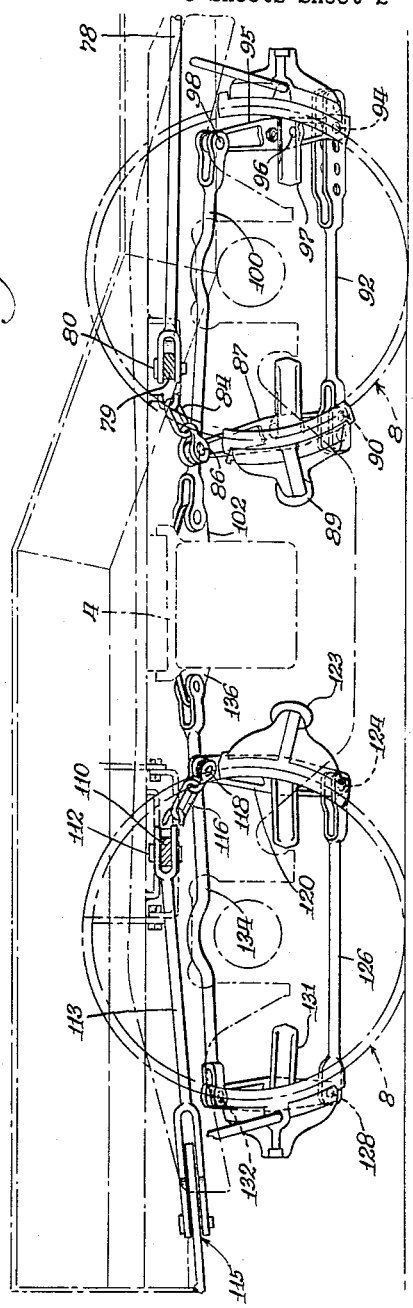
INVENTOR.
Carl E. Tack
BY Walter J. Sellegel, Jr.
Atty.
Witness
William N. Embert Aug. 30, 1960 C. E. TACK 2,950,781
RAILWAY BRAKE
Filed March 6, 1957 3 Sheets-Sheet 3

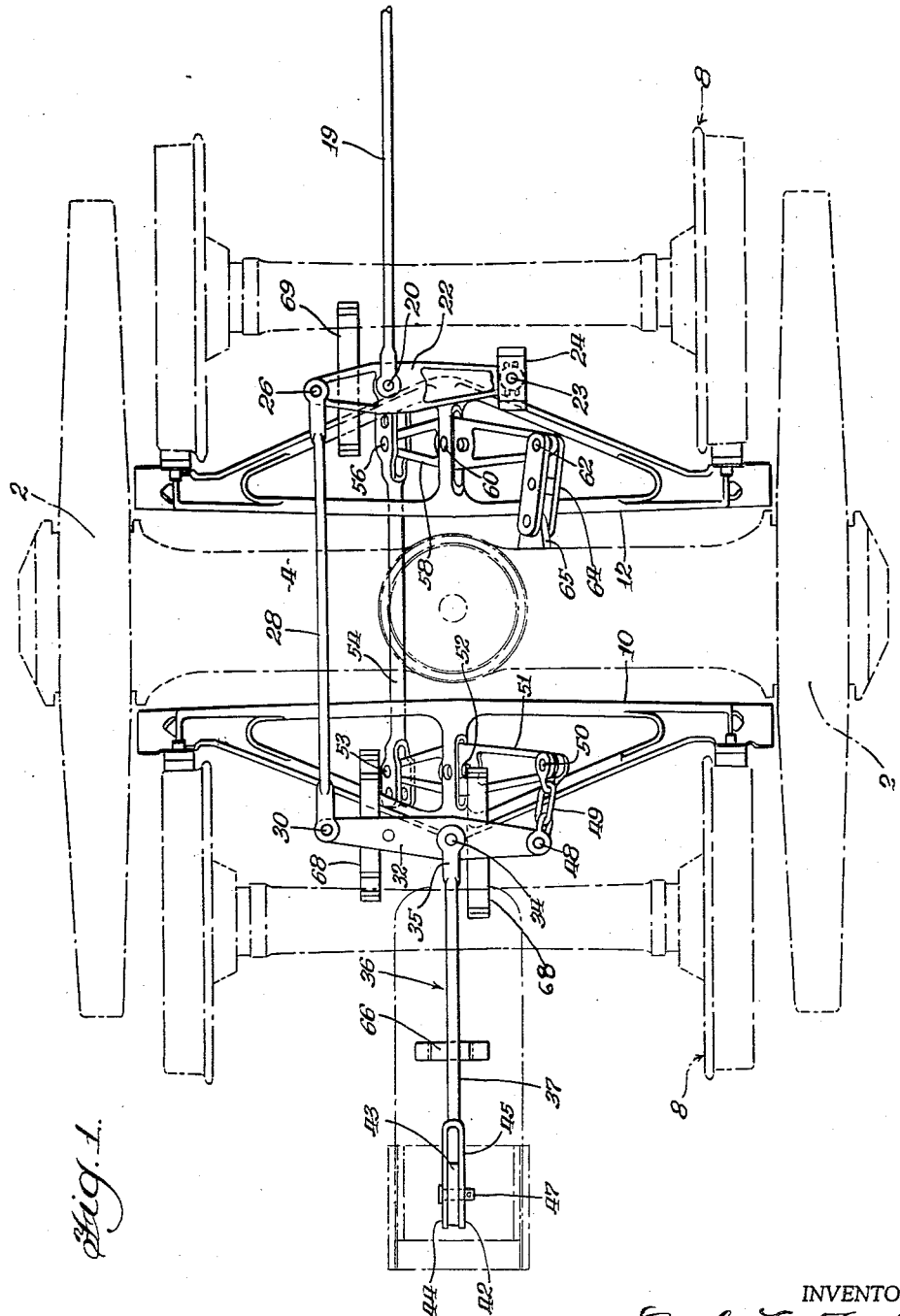

INVENTOR.
Carl E. Tack
BY Walter L. Schlegel, Jr.
Atty.

Witness:
William N. Ember

United States Patent Office 2,950,781
Patented Aug. 30, 1960

2,950,781

RAILWAY BRAKE

Carl E. Tack, Chicago, Ill., assignor to American Steel Foundries, Chicago, Ill., a corporation of New Jersey Filed Mar. 6, 1957, Ser. No. 644,298

1 Claim. (Cl. 188—52)

My invention relates to a brake arrangement for a railway car truck and, more particularly, to a brake arrangement which allows quicker and easier manual adjustment of the brake arrangement in order to obtain safe, normal braking operation.

A general object of my invention is to provide a brake arrangement suitable for a railway car truck where alignment of the brake equipment and wheels will be maintained regardless of any lateral movement between the wheel and axle assemblies and the brake system.

A more specific object is to provide an adjustable novel linkage arrangement on a railway car truck in order to adjust for wear of parts of the braking system, and, consequently, to reduce the braking time and distance of the railway car.

A still further object is to provide a low cost brake system which enables adjustment of the brake system easily and quickly.

Another object is to provide a clasp brake arrangement suitable for a railway car truck provided with an adjustment mechanism for the brake system.

In the drawings:

Figure 1 is a top plan view of a railway car truck embodying my invention;

Figure 2 is a side elevational view of the embodiment of Figure 1;

Figure 4 is a side elevational view of the modification shown in Figure 3.

Figure 3:
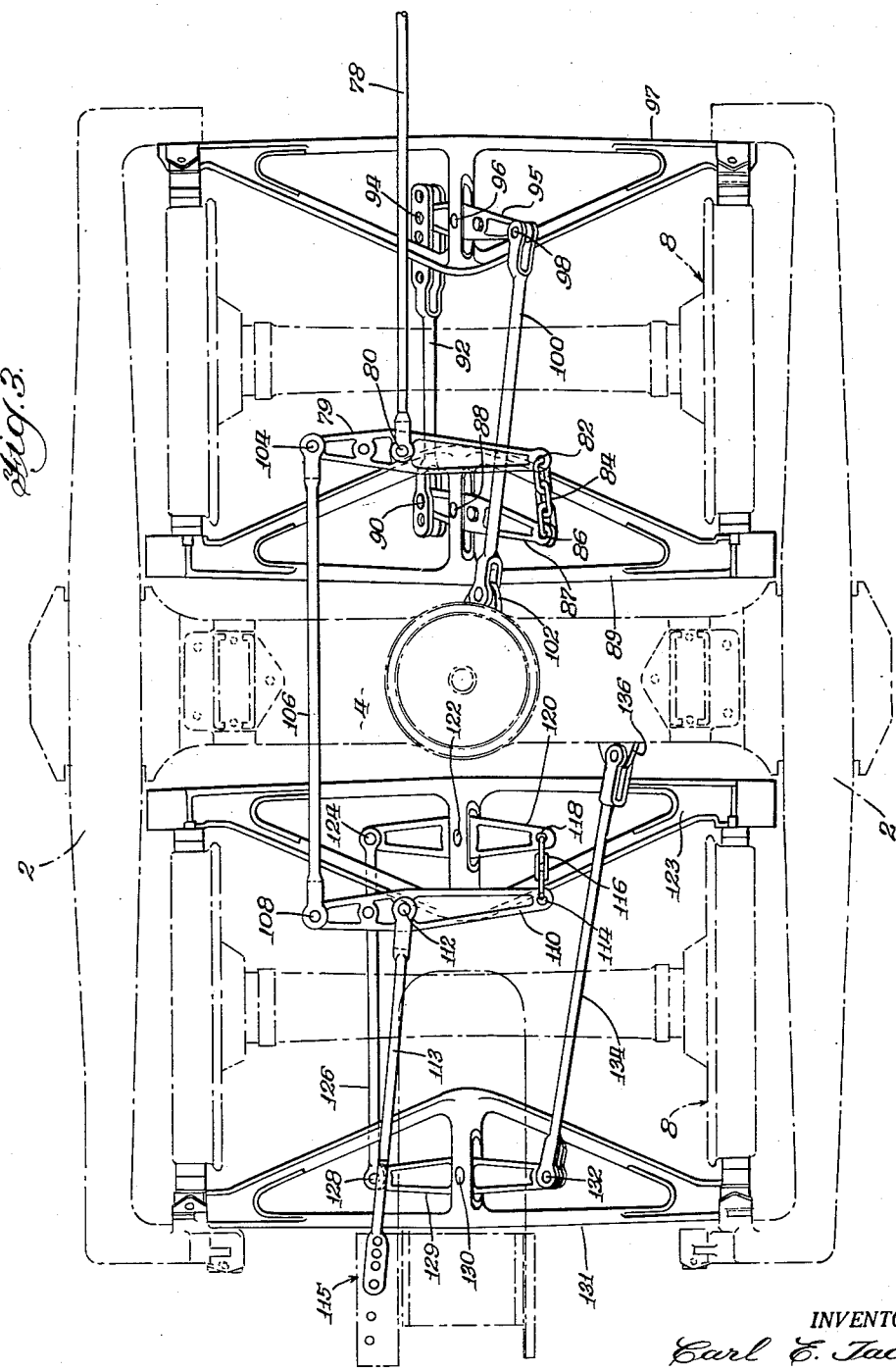
Figure 3 is a top plan view of a modification of the device of Figure 1.

For the sake of simplicity certain features of the brake system have been omitted which need not be shown because they are conventional.

Describing the structure in detail, the truck (Figure 1) may comprise the usual side frames 2, between which may be connected a conventional bolster 4, each end of which may be received in a bolster opening 6 of the adjacent side frame 2, and resiliently mounted therein by spring means (not shown). Each frame 2, has at its opposite ends journal box openings 7 for receiving journal boxes (not shown) for the wheel and axle assemblies 8.

The brake system may comprise truss type brake beams 10 and 12 which may be supported at their ends by side frame pockets, the pockets not being shown because they are conventional.

Brake heads 13 and 14 (Figure 2) with associated brake shoes 16 and 18, respectively, are supported at the ends of the brake beams 10 and 12, respectively. A pull rod 19 (Figure 1, right) connects as at 20, a power means (not shown) to a substantially horizontal dead actuating lever 22. Actuating lever 22 is fulcrumed at its end, as at 23, to a fulcrum bracket 24 which is secured, as by welding, to the underside of a car body (not shown). The other end of dead actuating lever 22 is pivotally connected at 26 to a substantially horizontal pull rod 28, the pull rod 28 extending over the bolster 4 and connecting, as at 30, to an end of a dead actuating lever 32. Dead actuating lever 32 is pivotally connected intermediate its ends, as at 34, to an end 35 of a substantially horizontal adjusting or tension rod 36. The end 35, may be integral with the intermediate portion 37 of adjusting rod 36, the end comprising a pair of vertically spaced arms 38 and 40 (Figure 2) and pivotally securing adjusting rod 36 to actuating lever 32. The other end 45 of adjusting rod 36 may be integral with the intermediate portion 37, the end 45 comprising a pair of U-shaped horizontal arms 42 and 44 (Figure 1) disposed on both sides of a lug or bracket 43, said lug being secured, as by welding, to the underside of the car body (not shown). The arms 42 and 44 have a plurality of spaced apertures 46 for adjustably securing the adjusting rod 36 to the bracket 43. A pin 47 secures rod 36 to bracket 43; said pin 47 being inserted in one of the aligned apertures in either arm 42 or 44. The pin 47 enters and passes through a hole disposed in the bracket 43 and enters an aperture in the second arm corresponding to the aperture in the first arm. The pin 47 is then prevented from sliding out of the hole and apertures by any locking means that may be used. The locking means may be a cotter key. The bracket 43 is located outwardly of the truck and intermediate the side frames 2. The other end of dead lever 32 is pivotally connected, as at 48, to an end of a link and clevis means 49. The other end of link and clevis means 49 is pivotally connected at 50 to an end of a live brake lever 51. Brake lever 51 is pivotally connected intermediate its ends, as at 52, to brake beam 10. The other end of live brake lever 51 is pivotally connected, as at 53, to an end of a substantially horizontal push rod 54 which may be located below the level of the axles of the wheel and axle assemblies. The push rod 54 extends below the bolster 4 and is pivotally connected, as at 56, to an end of a dead brake lever 58. Dead brake lever 58 is centrally pivoted, as at 60, to brake beam 12. Brake lever 58 may be pivotally connected, as at 62, to a dead fulcrum link means 64 which is connected to a conventional fulcrum bracket 65 mounted on the truck bolster 4.

The adjusting rod 36 may have a safety and balance bracket 66 secured, as by welding, to the underside of the car body (not shown). Also, the dead actuating levers 32 and 22 may have safety and balance brackets 68 and 69, respectively, which are secured, as by welding, to the underside of the car body (not shown).

In operation, power means (not shown) actuates the pull rod 19 so as to rotate actuating lever 22 in a clockwise direction around 23. Consequently, lever 22 moves pull rod 28 to the right which rotates lever 32 in a clockwise direction around 34. The lever 32 pulls link and clevis means 49 to the left and the link means 49 rotates brake lever 51 in a clockwise direction. Consequently, brake beam 10 moves to the left and engages the brake shoe assemblies on brake beam 10 with the adjacent wheels. As lever 51 rotates, push rod 54 moves to the right and rotates lever 58 in a clockwise direction around 62. Consequently, brake beam 12 moves in the direction of the other wheel and axle assembly and engages the brake shoe assemblies of beam 12 to the wheels.

In the novel brake system shown in Figures 3 and 4, a clasp brake arrangement with the adjusting rod is shown.

In the clasp brake arrangement, a pull rod 78 (Figure 3, right) connects a power source (not shown) to a substantially horizontal live actuating lever 79 at an intermediate point 80, and an end of lever 79 connects, as at 82, to an end of a link and clevis means 84. The other end of link and clevis means connects, as at 86, to an end of a live brake lever 87. This end of live brake lever 87 may be located above the level of the axles of the wheel and axle assemblies 8. The live brake lever 87 is centrally pivoted as at 88 to a brake beam 89 and the other end of brake lever 87 is pivotally connected, as at 90, to an end of a substantially horizontal pull rod 92.

The other end of pull rod 92 is pivotally connected, as at 94, to an end of a dead brake lever 95. The dead brake lever 95 is centrally pivoted, as at 96, to a brake beam 97. The other end of brake lever 95 may be located above the level of the axles of the wheel and axle assemblies and is pivotally connected, as at 98, to an end of a fulcrum rod 100, the other end of fulcrum rod 100 being connected to fulcrum bracket 102 located on bolster 4.

Actuating lever 79 connects, as at 104, to an end of a pull rod 106. The pull rod 106 extends over the bolster 4 and connects at its other end, as at 108, to an end of a dead actuating lever 110. Dead actuating lever 110 is fulcrumed intermediate its ends, as at 112, to an end of an adjusting rod 113, which is similar to adjusting rod 36 of Figures 1 and 2. The other end of adjusting rod 113 is pivotally connected to an adjusting bracket 115 which may be secured, as by welding, to the underside of a car body (not shown).

The other end of dead actuating lever 110 is pivotally connected, as at 114, to an end of a link and clevis means 116 and the other end of link and clevis means 116 is connected, as at 118, to an end of a live brake lever 120. The live brake lever 120 is centrally pivoted, as at 122, to a brake beam 123. The other end of brake lever 120 may be located below the level of the axles of the wheel and axle assemblies and is pivotally connected, as at 124, to an end of a substantially horizontal pull rod 126. The other end of pull rod 126 is connected, as at 128, to an end of a dead brake lever 129. Dead brake lever 129 is centrally pivoted, as at 130, to a brake beam 131. The other end of brake lever 129 may be located above the level of the axles of the wheel and axle assemblies and is connected, as at 132, to a fulcrum rod 134 which may be fulcrumed to the bolster 4 by fulcrum bracket 136.

In operation, power means (not shown) moves pull rod 78 to the right which in turn supplies movement of translation to the live actuating lever 79. Consequently, link and clevis means 84 and pull rod 106 move to the right at the same time. The live brake lever 87 is connected to link and clevis means 84, therefore, brake beam 89 moves in the direction of the adjacent wheel and axle assembly so as to engage the brake shoe assemblies on brake 89 with the wheels. As brake beam 89 moves toward the wheels, brake lever 87 rotates in a counterclockwise direction and pulls pull rod 92 to the left which in turn engages the brake shoe assemblies of brake beam 97 which is located on the opposite side of the wheels. As pull rod 106 moves to the right, dead actuating lever 110 rotates in a clockwise direction so as to move link and clevis means 116 to the left. Therefore, brake lever 120 on brake beam 123 moves brake beam 123 in the direction of the other wheel and axle assembly so as to engage the brake shoe assemblies with these wheels. Brake lever 120 also rotates in a clockwise direction which moves pull rod 126 to the right. Pull rod 126 pulls dead brake lever 129 on brake beam 131 in the direction of the other wheel and axle assembly so as to engage the brake shoe assemblies with these other wheels.

The novel linkage arrangement with the adjusting mechanism allows quicker and easier adjustment of the brake system of a railway vehicle. Because of this, trains can be moved from terminals more rapidly without neglecting brake adjusting necessary to obtain safe and normal brake shoe travel.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claim.

I claim:

In a single shoe tread brake arrangement for a railway vehicle truck having a vehicle body supported thereon and including a frame and a pair of supporting wheel and axle assemblies, the combination of: brake beams disposed between and inwardly adjacent respective assemblies and carrying friction means for engagement with said respective assemblies; a pair of brake levers pivotally connected to respective beams, one of said brake levers being a dead lever fulcrummed to the truck frame, the other of said brake levers being a live lever; a rod interconnecting the ends of said levers; an actuating lever connected to said live brake lever; means to operate the actuating lever; a tension rod connected at one end to the actuating lever; and adjustable means pivotally connecting the other end of the tension rod to the vehicle body.

References Cited in the file of this patent

UNITED STATES PATENTS

| | | |
|---|---|---|
| 1,762,586 | Priebe | June 10, 1930 |
| 1,912,346 | Hankins | May 30, 1933 |
| 2,013,048 | Hankins | Sept. 3, 1935 |
| 2,171,514 | Hedgcock | Aug. 29, 1939 |
| 2,354,972 | Baselt | Aug. 1, 1944 |
| 2,354,973 | Baselt | Aug. 1, 1944 |
| 2,684,130 | Goodwin | July 20, 1954 |